This invention relates to surgical dressings, and, more particularly, to a stabilized non-adherent dressing of an improved type.

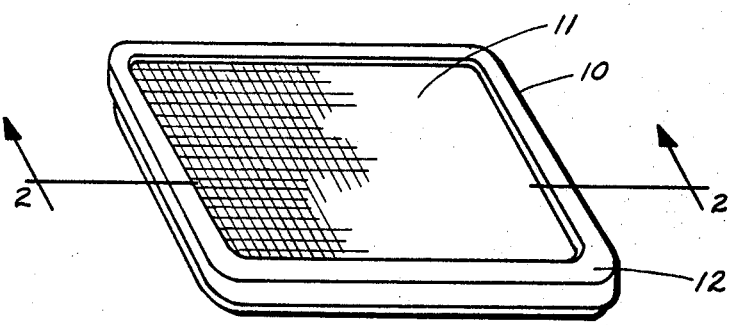
Fig. 1.
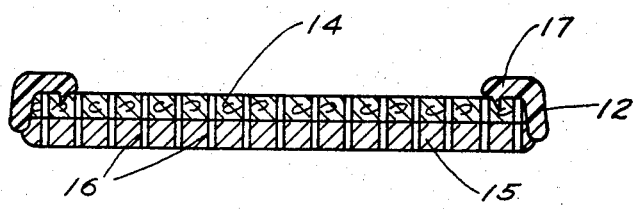
Fig. 2.
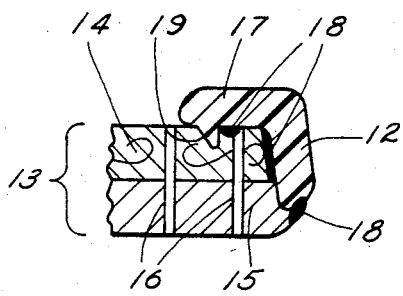 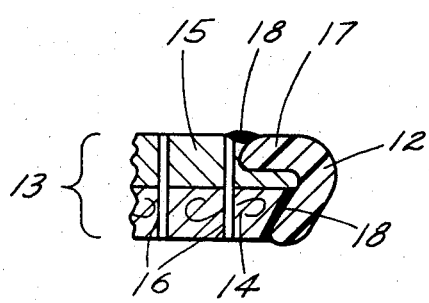
Fig. 3.   Fig. 4.
INVENTOR.
WILLIAM G. MEIER
BY David B. Ehrlinger 3,416,524
SURGICAL DRESSING
William G. Meier, Grosse Pointe Park, Mich., assignor to Parke, Davis & Company, Detroit, Mich., a corporation of Michigan
Filed Dec. 16, 1966, Ser. No. 602,302
3 Claims. (Cl. 128—156)

Recently, a material with superior non-adherent properties has been developed for the manufacture of surgical dressings. This superior material referred to below in detail is a bonded laminate comprising needled webs of neutral organic plastic resin fiber and cellulosic material. One face of the laminate is composed of porous resin and this serves as the non-adherent contact surface for the wound. The opposite face of the laminate is a cellulosic material which undesirably has a relatively low abrasion resistance. Also, the laminated material undesirably tends to delaminate when employed in certain types of dressing, particularly under stress of normal wear. A consequence of abrasion and delamination is that fibrous particles and other small particles can become dislodged from the dressing onto the wound site from which their later removal may be difficult and even distressing.

It is an object of the present invention therefore to provide an improved non-adherent surgical dressing which is stabilized against abrasion, delamination, etc. It is also an object of the invention to provide an economical non-adherent surgical dressing which can be efficiently made in large volume and which can be subjected safely to autoclaving or steam sterilization.

Another object is to provide a surgical dressing which can be applied to the wound site and kept there for indefinite periods under widely varying conditions of use without risk of introducing extraneous debris or particles to the wound site.

Still another object is to provide an improved surgical dressing which can readily be manufactured and packaged in sterile condition and thereafter be distributed and used, all the while retaining its intended structural form and aesthetic appearance.

Other objects, advantages and purposes will be seen in the following description in reference to the accompanying drawings in which:

FIGURE 1 is a perspective view of a dressing according to the invention showing a non-adherent dressing pad;

FIGURE 2 is a diagrammatic cross-section of a dressing of FIGURE 1 taken on line 2—2; and FIGURES 3 and 4 are cross-sectional views of preferred constructions at the edge of the pad of the type shown in FIGURE 1.

As seen in FIGURE 1, the non-adherent dressing 10 of the invention comprises a laminated pad 13 with the pad surface 11 surrounded by the edge frame or crown 12. The laminated pad 13 comprises a cellulosic layer 14 and a resin fiber layer 15. The two layers 14 and 15 are joined by needled resin fibers 16. The pad can be any of a wide variety of sizes, shapes, thicknesses, etc., for application to various parts of the body, depending on particular requirements. The cellulosic layer is one having moisture absorption properties and is composed of a non-woven mat or web of natural fibers such as cotton, artificial fibers such as rayon, or mixtures of such fibers and similar fibers. The layer may also contain supplemental bonding agents or adjuvants such as an inert thermoplastic bonding fiber, for example, polypropylene fiber. The resin fiber layer 15 for direct application to the wound site is one permitting free flow to moisture and yet inert and compatible with the wound surface. Any of various resins or mixtures of resins which meet these requirements and which are thermoplastic, as will be hereinafter described, will be satisfactory. The polyolefins such as polyethylene, polypropylene, etc. and other similar inert resin materials are suitable. Polypropylene is preferred for its ability to windstand steam sterilization. Other absorbent layers such as cellulose wadding, open weave textile and the like can, if desired, be included with the cellulosic layer. The cellulosic layer and the resin fiber layer in the pad according to the invention are secured together by needling and heat fusion. In the needling operation used to produce pads of this type, the somewhat loose laminate of cellulose and resin fiber mats is processed through a needling machine wherein the needles are injected through the laminate causing the ensnared resin fibers to pass through the cellulosic layer at spaced points in a predetermined pattern, and the needled fibers 16 are then heat fused in place. Fusion of the needled laminate is accomplished conveniently by passing the laminate through pressure rolls with the resin fiber layer in direct contact with the heat surface to cause the fibers to soften, merge and rearrange to a substantially flat, smooth, integral, porous surface with the needled fibers in the laminate likewise merged into the compressed cellulosic mat. Upon cooling, immediately after leaving the pressure rolls, the resin is caused to harden and the compressed webs are thus transformed into a single integrated laminate having the characteristics of a smooth durable dense blanket structure. A suitable needled, pressure-secured pad of the kind just described can be made for purposes of illustration by the following procedure: a sheet of cellulose wadding (14 lbs./ream) is laid over a non-woven web of rayon fibers (1⅛" length, 3 denier) and a like web of non-woven polypropylene fibers is next laid over the first web (to provide a weight ratio per unit area of about 46 parts polypropylene, 21 parts wadding and 33 parts rayon). The resulting laminate weighing about 4¾ ounces per square yard is passed through a needling machine having 9 barbs per needle to give between 100–120 needle perforations per square inch through the laminate. The laminate is then fed through heat rolls for exposure of ½ second to 20 lbs. per square inch and temperatures about 270° F. to 350° F. and higher sufficient to fuse the resin and provide a smooth surface with non-adherent characteristics. The laminated pad material produced by this procedure is superior to earlier materials but, as indicated above, is nevertheless unsatisfactory because of delamination, low resistance to abrasion, etc.

The present invention, however, provides freedom from fraying, loose fibers, delamination and the like by incorporating the frame or crown 12 surrounding and stabilizing the edges of the cellulosic layer 14 and the resin fiber layer 15, the crown means being secured to the pad and in close contact around the edge of the pad. The crown includes flange 17 which contacts one of the two open surfaces of the pad and which may conveniently be secured to the pad surface by bonding zones 18 and/or anchoring spur 19 or by other suitable means. As in the preferred embodiments illustrated in FIGURES 3 and 4, the invention contemplates the alternate arrangements wherein the flange bears on either the absorbent face or the non-adherent face of the pad. In either case the flange serves advantageously to stabilize the layers and to hold them as an integral unit for concentrated support upon the wound site. Any of a variety of materials may be used for the crown. The crown suitably is made of a thermoplastic substance, i.e., an inert thermoplastic resin which is sufficiently flexible for purposes of applying with the pad to curved body surfaces and yet which affords sufficient rigidity to stabilize the pad and prevent delamination, etc. Preferably, the crown is made of non-opaque polypropylene plastic having heat responsive properties similar to those of thermoplastic material used for the fiber of the resin fiber layer 15. The flange is conveniently made by conventional methods for forming thermoplastic pieces such as thermo-forming or molding. The flange should be able to withstand sterilization, particularly autoclaving and steam sterilization temperatures. A preferred embodiment of the invention is a stabilized pad of the type descirbed in which the crown when subjected with the assembled pad to steam sterilization undergoes appreciable softening or fusion whereby the crown tends to merge with the adjacent loose fibers or frayed edges of the pad and upon cooling locks the same in secured position.

Referring to FIGURES 3 and 4, it will be noted that the invention contemplates provision of means for securing the flange to the resin fiber layer at one or more of the seal zones 18. These seal zones can be made with any suitable adhesive material, preferably adhesive means activated by elevated temperature. The crown 12 also is secured to the cellulosic layer 14, preferably by the elongated zone indicated at 18 of FIGURES 3 and 4. The latter seal can be accomplished using conventional adhesives such as vegetable or casein adhesives, resin adhesives, etc. The adhesive may be supplied by the thermopolastic fusion properties of the crown 12 but preferably is provided by supplementary adhesive applied in any suitable way to the edges of the cellulosic layer. A preferred construction of the crown is show in FIGURES 3 and 4 wherein the crown joins the non-adherent surface at a line slightly below the surface intended for contact with the skin or wound site. This arrangement desirably enables the pad to be applied to the wound site in such a way that the pressure of the pad is mainly concentrated over the surface of the non-adherent material whereas the crown itself contacts the skin only slightly if at all, i.e., with a minimum of pressure. The crown is preferably constructed with a slant from the nonadherent surface inwardly to the opposite surface of the pad to facilitate attachment of adhesive tapes or other supplementary bandaging for securing the pad to the body surface. The invention contemplates the provision of a protective envelope suitable in connection with sterilizing and maintaining the dressing in sterile condition for eventual application to the wound site.

While the invention has been described in detail in the foregoing specification, it will be realized by those skilled in the art that considerable variation can be made in such detail without departing from the spirit of the invention.

I claim:
1. In a surgical dressing having a non-adherent laminated pad with at least one cellulosic layer and a porous resin fiber layer mutually secured by needling means, the improvement comprising crown means surrounding and stabilizing the edges of the cellulosic layer and the resin fiber layer, the crown means containing a flange contacting one of the pad surfaces, the crown means being secured to the pad whereby the pad is protected from delamination and dislodgement of fibrous particles from the pad.

2. A surgical dressing according to claim 1 wherein the crown means is fabricated of thermoplastic material and is secured to the pad by heat responsive adhesive means.

3. A surgical dressing according to claim 1 wherein the pad comprises a needled non-woven rayon-polypropylene fiber heat bonded laminate and a polypropylene crown secured to the pad by thermoplastic adhesive seal means.

References Cited

UNITED STATES PATENTS

| | | | |
|---|---|---|---|
| 2,923,298 | 2/1960 | Dockstader et al. | 128—296 |
| 3,122,141 | 2/1964 | Crowe | 128—296 |
| 3,156,242 | 11/1964 | Crowe | 128—156 |
| 3,229,691 | 1/1966 | Crowe | 128—156 |
| 3,331,728 | 7/1967 | Lane | 161—112 |

ADELE M. EAGER, *Primary Examiner.*

U.S. Cl. X.R.

128—171, 268; 206—63.2